(12) United States Patent
Graewe

(10) Patent No.: US 6,635,207 B1
(45) Date of Patent: Oct. 21, 2003

(54) PROCESS FOR RECYCLING OF POWDER COATING WASTE

(75) Inventor: René Graewe, Essenbach (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 299 days.

(21) Appl. No.: 09/642,912

(22) Filed: Aug. 21, 2000

(51) Int. Cl.[7] .............................. B29B 9/08; B29C 67/02
(52) U.S. Cl. ........................ 264/117; 264/122; 264/310; 264/319; 264/911; 23/313 R
(58) Field of Search .................................. 264/117, 118, 264/122, 125, 126, 6, 12, 15, 911, 310, 311; 23/313 R

(56) References Cited

U.S. PATENT DOCUMENTS

| | | | |
|---|---|---|---|
| 3,514,510 A | | 5/1970 | Hoffman, Jr. |
| 4,726,908 A | * | 2/1988 | Kruse et al. .................. 252/91 |
| 5,210,130 A | * | 5/1993 | Howard, Jr. ................. 524/789 |
| 5,565,164 A | * | 10/1996 | Goehner et al. ............ 264/321 |
| 5,620,643 A | | 4/1997 | Maiden et al. |
| 5,831,123 A | * | 11/1998 | Gergely et al. ............. 562/584 |
| 6,433,030 B1 | * | 8/2002 | Blatter et al. ................. 521/40 |

FOREIGN PATENT DOCUMENTS

| | | |
|---|---|---|
| DE | 1454738 A | 6/1969 |
| DE | 4028567 | 3/1992 |
| EP | 0 075 183 A1 * | 9/1982 |
| EP | 0683199 A2 | 11/1995 |
| EP | 0 683 199 A2 | 11/1995 |
| EP | 0 982 380 A1 | 3/2000 |
| WO | 96/15891 | 5/1996 |
| WO | 98/33848 | 8/1998 |
| WO | WO 98/33848 | 8/1998 |
| WO | 00/15705 | 3/1999 |
| WO | 99/23068 | 5/1999 |
| WO | WO 99/23068 | 5/1999 |
| WO | 99/23176 | 5/2000 |

* cited by examiner

*Primary Examiner*—Stefan Staicovici
(74) *Attorney, Agent, or Firm*—Steven C. Benjamin

(57) ABSTRACT

Process for recycling of powder coating waste, wherein powder coating waste is moved in a vessel rotating about a rotational axis inclined at an angle of 20 to 70 degrees to the horizontal and is thereby exposed to heat, until powder coating agglomerates with a size of 1 mm to 3 cm or 1 to 10 mm or powder coating pearls with a size of 1 to 10 mm are formed.

16 Claims, No Drawings

PROCESS FOR RECYCLING OF POWDER COATING WASTE

FIELD OF THE INVENTION

The invention relates to the recycling of powder coating waste.

BACKGROUND OF THE INVENTION

The preparation of powder coatings is mostly carried out by extruding the powder coating ready formulated by dry mixing of all the required components (powder coating fresh material) in the form of a paste-like melt, cooling off of the melt, coarse comminution into so-called powder coating chips, fine milling (grinding) and subsequent sieving and classifying to desired grain fineness (powder coating classification). Powder coating material that is too coarse-grained (high grain) on sieving can again be fine-milled. Powder coating material that is too fine-grained (low grain) represents waste.

Powder coating waste also arises in the form of powder coating overspray during the powder coating application.

Powder coating waste should if possible be recovered as powder coating to be employed for the original use, not only because of environmental considerations, but also because powder coatings are precious materials.

Various methods which allow recycling of powder coating waste to be used for the original purpose are described in the patent literature.

DE-A-40 28 567 thus describes direct recycling of powder coating overspray by addition to the powder coating fresh material or during extrusion. The process requires considerable expenditure during extrusion of the finely divided material.

In WO 96/15891 pressing of powder coating waste into friable tablets, which are then extruded together with powder coating fresh material, is described.

It is known from EP-A-0-683 199 to form a layer of powder coating waste, to expose the latter to heat, wherein the powder coating particles coalesce without degradation or cross-linking of the powder coating. IR-radiators can serve as the heat source. The coalesced powder coating particles are then again extruded alone or together with powder coating fresh material.

The processes known from DE-A-40 28 567, WO 96/15891 and EP-A-0-683 199 include a re-extrusion of the powder coating waste. This is linked to the danger of a too high thermal load.

WO 98/33848 describes the agglomeration of finely divided powder coating residues under the influence of pressure. The agglomerates can be returned to the powder coating preparation process.

WO 99/23068 and WO 99/23176 describe compacting of powder coating waste by applying pressure. The compacted powder coating waste can be ground together with fresh powder coating material that is to be ground.

The processes known from WO 98/33848, WO 99/23068 and WO 99/23176 require the application of pressure by suitable pressing devices.

WO 00/15705 describes the heating of powder coating fine grain without melting or cross-linking it completely. The powder coating fine grain thereby becomes sufficiently sticky and forms an agglomerated mass, which is treated further after cooling off in order to prepare powder coating particles therefrom having the desired particle size. The agglomerated mass is a powder coating material which is not convenient in operation.

EP-A-0 982 380 describes the preparation of powder coating particles having a particle size suited for application by agglomeration of powder coating fine grain by heat and preferably with the use of auxiliary products promoting the agglomeration. The process is extremely difficult to control due to the high requirements concerning the particle size distribution of the powder coating suited for application.

An object of the invention is to provide a simple process for recycling powder coating waste. It should be possible to carry out the process without pressure, i. e. without application of pressing forces onto the powder coating waste. The powder coating material to be recycled should be subjected as little as possible to heat. There should be no obligation to add auxiliary products, as these would necessarily bring about a change in the composition of the powder coating or would have to be removed.

SUMMARY OF THE INVENTION

The invention solves the problem in that powder coating waste is subjected to reduced heat while moving in a rotating vessel.

The invention therefore consists in a process for recycling of powder coating waste comprising the steps of placing powder coating waste into a vessel; rotating the vessel about a rotational axis inclined at ah angle of 20 to 70 degrees relative to the horizontal; and heating the powder coating waste until particulates with a size of 1 mm to 3 cm are formed.

DETAILED DESCRIPTION OF THE EMBODIMENTS

In the process according to the invention, powder coating waste is recycled. Powder coating waste is coating powder having particle sizes or particle size distributions which are not suitable for powder coating application or which deviate from the theoretical value. The powder coating wastes have average particle sizes ($d_{50}$), in the range of 1 to 100 $\mu$m for example. Examples of powder coating waste are powder coating-overspray having for example an average particle size ($d_{50}$) in the range of 10 to 100 $\mu$m, low grind according to the powder classification, for example having an average particle size ($d_{50}$) in the range of 1 to 20 $\mu$m, faulty powder coating batches having particle size distributions which are not within the theoretical values or powder coatings which do not conform to the theoretical values of particle size distribution, for example because of a faulty or over-long storage. The powder coating waste to be recycled in the process according to the invention can be thermoplastic or in particular duroplastic powder coating materials, which are for example curable by radiation or in particular thermally curable. The powder coating waste can be of pigmented powder coating or of powder clear coat.

The process according to the invention is suitable in particular for recycling high-quality powder coating waste, such as arises for example in the preparation or application of powder coatings used in the automotive industry, for example automotive powder clear coats.

Powder coatings can be described according to the characteristic temperature behaviour of each powder coating, i. e. several characteristic temperatures or discrete temperature ranges exist for each powder coating. Position and breadth of these temperatures or temperature ranges depend on the composition of each powder coating and can be determined by suitable physical methods. One commonly used determination method is for example DSC (differential scanning calorimetry). Powder coatings have a glass transition temperature, below which they are stored. The glass transition temperature of powder coatings is usually not a precisely defined glass transition temperature but for example a 20 to 40° C. wide glass transition temperature range. At temperatures above the glass transition temperature range, for example, powder coatings change into a rubber-elastic state, before the melting temperature range of the powder coatings is reached with a further rise of temperature. The breadth of the melting temperature range of powder coatings is for example from 20 to 150° C. and the lower limit of the melting temperature range is for example from 20 to 50° C. above the upper limit of the glass transition temperature range. The chemical cross-linking of a thermally curable powder coating starts to be noticeable within or above the melting temperature range. Particular importance is given for example therefore to a rapid passage of the melted powder coating in the extruder in the preparation of thermally curable powder coatings. In the case of thermally curable powder coatings, the baking temperature chosen for curing is above the melting temperature range. The flow of a thermally curable powder coating can be controlled by the value of the baking temperature. On one hand, the viscosity of a powder coating melt falls with rising temperature, while on the other hand the speed of the chemical cross-linking of a thermally curable powder coating increases and therewith the viscosity.

For example, using DSC at a heating rate of 10° C./min, a temperature behaviour of current automotive powder clear coats can be determined, which can generally be characterised by 20 to 30° C. wide glass transition temperature ranges with a centre in the range of 30 to 60° C., 40 to 50° C. wide ranges for the rubber-elastic state with a centre in the range of 50 to 100° C. and 20 to 100° C. wide melting temperature ranges with a centre in the range of 90 to 190° C.

In the process according to the invention, single-quality powder coating waste is preferably recycled. Single-quality powder coating wastes are characterised on the basis of an identical chemical composition by an identical temperature behaviour in the sense described above. In the case of pigmented powder coating wastes they are identically pigmented. In other words, it is preferred that the process not be carried out with mixtures of powder coating wastes of different composition.

In the process according to the invention the powder coating waste is moved in a vessel rotating about a rotational axis inclined at an angle of 20 to 70 degrees to the horizontal, i. e. the powder coating waste particles move around each other and thereby carry out rolling movements provoking a permanent, uniform through mixing of the powder coating material. First a rotatable vessel is filled with powder coating waste, for example at 10 to 50%, preferably at 20 to 40% of its volume. The filling proportion based on the lower working capacity of the vessel, dictated by the process, is usually higher and is for example at 75 to 100% of the filling volume which is theoretically possible. The powder coating waste is filed in bulk (loosely charged), i. e. without pressing the powder coating waste together. For the vessels, which can be rotated about a rotational axis inclined at an angle of 20 to 70 degrees to the horizontal, conventional equipment used in chemical or pharmaceutical technology may be used, such as for example drum mixers, drum mixers having an onion-like shape, dish granulators, drum granulators, or cone granulators. The vessels or interior vessel walls are preferably of a material, which allows easy cleaning and does not undergo any change in the range of temperatures in the process according to the invention. Preferred are vessels of special steel with a smooth interior surface. The vessels can be operated-in an open or closed state.

After filling with powder coating waste, the vessel is rotated about a rotational axis inclined at an angle of 20 to 70, preferably 30 to 60 degrees to the horizontal. The rotation is carried out at a speed which ensures a permanent through mixing of the powder coating waste which is always at the bottom of the rotating vessel. The rotational speed chosen is sufficiently low that a harmful influence on the powder coating waste with respect to the desired result is avoided. A distribution of the powder coating waste on the entire vessel wall brought about by too high centrifugal forces or a high-rupturing of parts of the powder coating waste in particular should be avoided. The rotational speed should be chosen so that through mixing of the powder coating waste particles is carried out in a very uniform manner. Under consideration of these limitations the maximum rotational speed depends for example on the density or bulk density of the powder coating waste. The rotational speed as defined by the circumferential speed is for example 20 to 75 m/min, preferably 20 to 55 m/min. Rotational speeds in the higher value range lead to the formation of smaller powder coating agglomerates.

While the powder coating waste is uniformly moved by the rotation of the vessel and is thereby uniformly through mixed, it is exposed to heat until at least 1 mm to 3 cm powder coating agglomerates have formed. It is advantageous that, due to the constant circulation, the heat load of the powder coating material is extremely uniform.

The heat action on the powder coating material in motion is carried out in such a way that a temperature (theoretical temperature T1) is set which is within the glass transition temperature range to below the melting temperature range, preferably above the glass transition temperature range. Preferably a uniform temperature with a temperature deviation of for example not more than +/−5° C. is set within the powder coating material. The melting temperature range shall in no case be reached, likewise avoiding a worth mentioning chemical reaction of the cross-linking system in the case of thermally curable powder coating material. The temperature of the powder coating material in motion can be determined directly within the powder coating material or without contact, for example pyrometrically, on its surface. The heat supply can be accordingly controlled.

The duration of the described agglomeration process is chosen such that powder coating agglomerates of 1 mm to 3 cm or preferably 1 to 10 mm are formed. The duration depends amongst other things on the batch size, the process can for example last 15 to 30 minutes after reaching the theoretical temperature T1 in the powder coating waste with batch sizes of 50 to 100 kg powder coating waste. The size of the forming powder coating agglomerates can essentially be controlled by the rotational speed of the rotatable vessel as mentioned above. A rotational speed of the vessel within the higher value range thereby brings about the formation of powder coating agglomerates in the lower size range, the reverse applies in the reverse situation.

The process according to the invention allows the preparation of powder coating agglomerates with a size of 1 mm to 3 cm or preferably of 1 mm to 10 mm from powder coating waste. With a preferred embodiment of the process according to the invention, however, powder coating pearls with a size of 1 to 10 mm are prepared. This can be brought about in the manner described above for the preparation of the powder coating agglomerates by just extending the duration of heat action at the theoretical value T1. The duration is for example increased by 30 to 45 minutes for batch sizes of 50 to 100 kg powder coating waste.

Preferably, powder coating pearls are prepared however by through-glassing of powder coating agglomerates with a size of 1 to 10 mm prepared as described above to powder coating pearls having a size of 1 to 10 mm in a subsequent step at a temperature (theoretical temperature T2) which is higher than the one used for the preparation of the powder coating agglomerates with a size of 1 to 10 mm (theoretical temperature T1). The temperature is therefore increased with respect to the temperature applied in the formation of the powder coating agglomerates, but in any case the operation is carried out below the melting temperature range of the powder coating. In the case of thermally curable powder coating material, a worth mentioning chemical reaction of the cross-linking system is avoided. The powder coating pearls are preferably prepared from the powder coating agglomerates at a temperature above the glass transition temperature range. A uniform temperature is preferably set with a temperature deviation comprising for example not more than +/−5° C. within the powder coating agglomerates in motion. The duration of the glassing process described is chosen so that powder coating pearls with a size of 1 to 10 mm are formed from the powder coating agglomerates with a size of 1 to 10 mm; the process can last 15 to 30 minutes for example with batch sizes of 50 to 100 kg of 1 to 10 mm large powder coating agglomerates after reaching the theoretical temperature T2 within the powder coating agglomerates. The completeness of the through-glassing of the powder coating agglomerates to powder coating pearls and thereby the end of the process can easily be tested by comparing the breaking behaviour of the powder coating pearls with that of powder coating chips in the powder coating milling process. The breaking behaviour of the powder coating pearls corresponds to that of powder coating chips.

The heat action on the powder coating material can be carried out by different heat supply methods, for example by supplying hot air corresponding to a desired temperature on the surface and/or below the surface of the powder coating material in motion and/or via a correspondingly tempered vessel interior wall. If a hot air supply is used, this needs to take place with care to avoid any blowing around or whirling up of the powder waste. Hot air can be supplied expediently below the surface of the powder coating material in motion, for example via a tube having a cooled wall and several bores.

It is preferred to supply the heat in the form of heat radiation, in addition to the heat supply methods mentioned above or in particular instead of these. The surface of the powder coating material in motion can therefore be irradiated by heat radiation. Position and distance of the heat radiation source are expediently chosen so that the greatest part of the surface of the powder coating material in motion is irradiated; the heat radiation source can for example be positioned at 30 to 100 cm above the surface of the powder coating material. The heat radiation source can be operated within or outside of the vessel. Heat radiation sources which are operated inside the vessel are preferably rinsed with an air cushion in order to avoid their contamination. Vessels operated in the open state or vessels operated in the closed state with a lid which transmits heat radiation are used in the case of heat radiation sources which are operated outside of the the rotating vessel. Conventional sources for infrared- or near infrared-radiation may be used as heat radiation sources, wherein the temperature in the powder coating material in motion is conveniently controlled via power consumption and/or suited clocking of the heat radiation sources.

After powder coating agglomerates or powder coating pearls are formed, they are cooled off below the glass transition temperature range, preferably while the vessel is still rotating. The cooling-off can take place after an interruption of the heat supply by temperature equalisation with the surroundings or it can be assisted by heat abstraction, for example by supplying dry cold air onto the surface and/or below the surface of the powder coating agglomerates or powder coating pearls in motion, by adding volatile cooling agents such as for example dry ice or liquefied inert gases and/or via a correspondingly cooled vessel interior wall. Care should be taken that no humidity condensates in the powder coating agglomerates or powder coating pearls if extra cooling is used.

It may be expedient and the performance of the process according to the invention may be helped if a scraper is provided within the rotating vessel in the rotating direction directly behind the powder coating material in motion in order to prevent powder coating material adhering to the vessel interior-wall.

The process according to the invention, herein described as a process operated in batch quantities, can also be carried out continuously.

The invention also relates to powder coating agglomerates obtainable with the process according to the invention and to the powder coating pearls obtainable with the preferred embodiment of the process according to the invention. The agglomerates and pearls will be collectively referred to as "particulates" where a distinction between them is not necessary.

The powder coating agglomerates with a size of 1 mm to 3 cm, preferably 1 to 10 mm and the powder coating pearls with a size of 1 to 10 mm obtainable with the process according to the invention are of a spherical form. Their size distribution is highly uniform. While the powder coating agglomerates can be divided without a large expenditure of force, the powder coating pearls are distinctive by their breaking behaviour which corresponds to the breaking behaviour of powder coating chips. The application of forces such as are needed for the milling of powder coating chips is required for their comminution.

Powder coatings having particle size distributions suitable for application within the theoretical value range can be prepared from the powder coating agglomerates and the powder coating pearls. While the powder coating agglomerates or the powder coating pearls can be supplied alone or together with powder coating fresh material for powder coating extrusion, it is advantageously possible in the case of powder coating pearls to supply these alone or together with powder coating chips directly for fine milling and to avoid the conventional processing steps before fine milling in the powder coating production process. The powder coating agglomerates as well as the powder coating pearls are forms of recycled powder coating waste which are convenient in operation. Their use for a new powder coating preparation allows that powder coating preparation and application is carried out practically without loss. The powder coatings prepared from powder coating agglomerates and powder coating pearls correspond to powder coatings which have been prepared exclusively with fresh material both with respect to their application technology behaviour and to the technological properties of coatings prepared therewith. The recycled powder coatings can therefore be used for their original purpose, their use not being limited to lower value purposes.

The process according to the invention is easy to carry out and allows recycling of powder coating waste which is practically without loss. It is carried out without the application of pressing forces on the powder coating waste, which is exposed only to a reduced heat load. A change in composition of the recycling material with respect to the fresh powder coating does not occur. The powder coating agglomerates and powder coating pearls are products which are easy to handle with respect to their further processing and can be used for preparing powder coating being of equal quality compared with the corresponding original powder coating.

EXAMPLE 45 kg automotive powder clear coating-low grind according to the powder coating classification (with a glass transition temperature range of 26 to 52° C. and a melting temperature range of 90 to 120° C. determined with DSC at a heating rate of 10° C./min) having an average particle size ($d_{50}$) of 10 μm were filled into a drum-mixer having an onion-like shape and made of special steel with a volume of 500 l. The mixer was rotated with a circumferential speed of 45 m/min about its rotational axis inclined at an angle of 45 degrees to the horizontal. The surface of the powder clear coating material in motion was irradiated through the aperture of the mixer with an infrared radiator fixed above at a distance of 50 cm (maximum power consumption 6 kW). After reaching a temperature of 55° C. (theoretical temperature T1) in the powder clear coating material, the temperature was kept for 25 min and thereafter the batch was heated to 75° C. (theoretical temperature T2) by further irradiation and the temperature was kept for 25 min. Thereafter the infrared radiator was switched off and the batch was cooled for 30 min while the mixer was still rotating. Powder clear coating pearls with a size of 1 to 10 mm were obtained, which could be further processed into a powder clear coating which after milling and classifying was not distinguishable in its properties from the original automotive powder clear coating.

What is claimed is:

1. A process for recycling of powder coating waste without application of pressure or addition of auxiliary products, comprising the steps of:
    placing powder coating waste into a vessel;
    rotating the vessel about a rotational axis inclined at an angle of 20–70 degrees relative to the horizontal; and
    exposing the rotating powder coating waste to heat at a temperature below the melting temperature of the powder coating waste until particulates having a size within the range of 1 mm to 3 cm are formed.

2. The process of claim 1, wherein the particulates formed are agglomerates having a size of 1 mm to 10 mm.

3. The process of claim 1 wherein the particulates formed are powder coating pearls having a size of 1 mm to 10 mm.

4. The process of claim 1, wherein the powder coating waste is selected from the group consisting of thermoplastic and duroplastic powder coating material.

5. The process of claim 1, wherein the powder coating waste is selected from the group consisting of pigmented powder coating and powder clear coat.

6. The process of claim 1, wherein the powder coating waste is single-quality powder coating waste.

7. The process of claim 1, wherein the rotational speed of the vessel ensures a permanent through mixing of the powder coating waste which is always at the bottom of the rotating vessel.

8. The process of claim 1, wherein the vessel is selected from the group consisting of a drum mixer, a drum mixer having an onion-like shape, a dish granulator, a drum granulator and a cone granulator.

9. The process of claim 1, wherein the rotating powder coating waste is heated to a temperature from within the glass transition temperature range of the powder coating waste to a temperature below the melting point of the powder coating waste.

10. The process of claim 1, wherein the rotating powder coating waste is heated to a temperature above the glass transition temperature range of the powder coating waste but below the melting temperature of the powder coating waste.

11. The process of claim 9, wherein agglomerates having a size of 1 mm to 10 mm are formed, and wherein the process comprises a further step of heating the agglomerates to through-glass the agglomerates to form powder coating pearls with a size of 1 mm to 10 mm, and wherein the step of heating the agglomerates is carried out at a higher temperature compared to the step of exposing the rotating powder coating waste to heat.

12. The process of claim 1, wherein the heat is applied to the powder material by means of a heating source selected from the group consisting of dry hot air, a heated interior wall of the vessel, heat radiation, and combinations thereof.

13. The process of claim 11, wherein the heating source consists of heat radiation.

14. The process of claim 1, further comprising the step of cooling the particulates to a temperature below the glass transition temperature range of the powder coating.

15. The process of claim 10, wherein agglomerates having a size of 1 mm to 10 mm are formed, and wherein the process comprises a further step of heating the agglomerates to through-glass the agglomerates to form powder coating pearls with a size of 1 mm to 10 mm, and wherein the step of heating the agglomerates is carried out at a higher temperature compared to the step of exposing the rotating powder coating waste to heat.

16. The process of claim 15, wherein the heat source consists of heat radiation.

* * * * *